Figure 1:
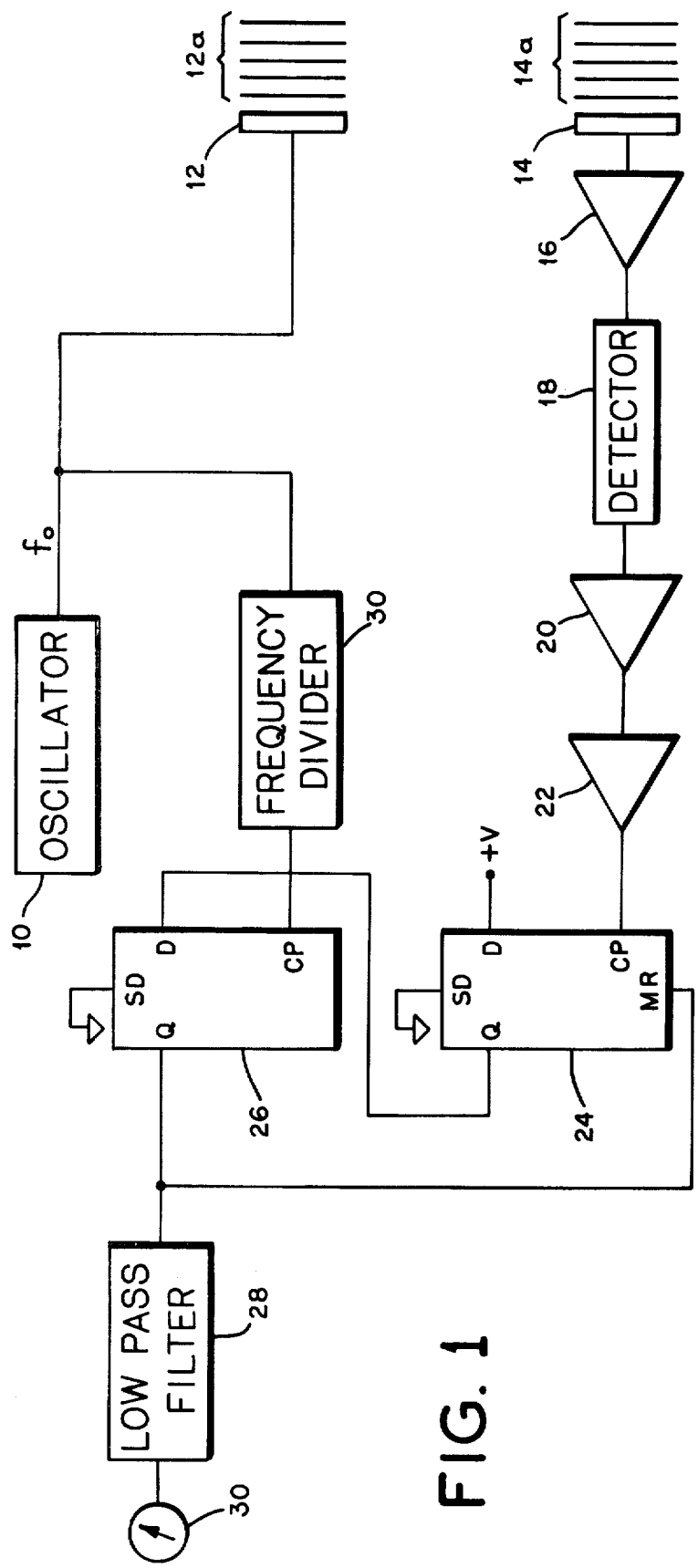

United States Patent [19]

Connery et al.

[11] 4,183,245
[45] Jan. 15, 1980

[54] SYNCHRONOUS FREQUENCY-TO-VOLTAGE CONVERTER FOR DOPPLER APPARATUS

[75] Inventors: James G. Connery, Ambler; Louis D. DiNapoli, Colmar, both of Pa.; Giancarlo Punis, Sicklerville, N.J.

[73] Assignee: Leeds & Northrup Company, North Wales, Pa.

[21] Appl. No.: 953,739

[22] Filed: Oct. 23, 1978

[51] Int. Cl.² .............................................. G01F 1/66
[52] U.S. Cl. ...................................... 73/194 A; 343/8
[58] Field of Search .................... 73/194 A; 340/3 D; 324/79 R; 343/8

[56] References Cited

U.S. PATENT DOCUMENTS

| 2,524,610 | 10/1950 | Storm et al. | 343/8 |
| 3,202,960 | 8/1965 | Galbraith | 324/79 R X |
| 3,443,433 | 5/1969 | Liston et al. | 73/194 A |
| 4,048,853 | 9/1977 | Smith et al. | 73/194 A |

*Primary Examiner*—Charles A. Ruehl
*Attorney, Agent, or Firm*—Raymond F. MacKay; William G. Miller, Jr.

[57] ABSTRACT

An ultrasonic Doppler flowmeter is provided with a frequency-to-voltage converter comprising a pair of interconnected filp-flops triggered by the Doppler frequency and a submultiple of the transmission frequency which produces a series of output pulses having a repetition rate determined by the Doppler frequency and a pulse duration inversely related to the frequency of transmission of the ultrasonic transmitter.

5 Claims, 2 Drawing Figures

SYNCHRONOUS FREQUENCY-TO-VOLTAGE CONVERTER FOR DOPPLER APPARATUS

BACKGROUND OF THE INVENTION

This invention relates to apparatus for producing an output signal varying in accordance with a Doppler frequency and more particularly to Doppler ultrasonic flowmeters compensated for changes in the frequency of the transmitted signal.

In ultrasonic Doppler flowmeters an oscillator having a frequency $f_o$ is connected to apply this frequency to an ultrasonic transducer so that an ultrasonic beam is propagated in a flowing fluid at an angle $\theta$ with respect to the direction of the flow. Part of the ultrasonic energy is reflected back to the transducer by air bubbles or particles in the fluid. Because the reflectors are traveling at the same velocity as the fluid, the frequency of the reflected energy is shifted from the transmitted frequency $f_o$ by an amount $F_d$ by virtue of the Doppler effect. For quantity $F_d$ is given by the well known equation $$F_d = 2V_f f_o(\cos\theta/C) \qquad (1)$$

where $V_f$ is the fluid velocity and C is the acoustic velocity in the fluid.

The usual ultrasonic Doppler flowmeter uses a monostable multivibrator triggered by the signal having a frequency $F_d$. Such a multivibrator generates a pulse of relatively fixed amplitude and duration with a repetition frequency $F_d$. A lowpass filter is then used to extract the average or dc level of the pulse train. It will be understood that any drift in the monostable multivibrator that would tend to change the pulse duration will introduce an error into the average level of the pulse train that is not related to the Doppler frequency. Additionally, reference to equation (1) will show that the Doppler frequency itself will not represent the fluid velocity if the transmitted frequency $f_o$ should change due to change in the frequency of the oscillator.

In order to overcome these sources of error, a synchronous frequency-to-voltage converter is proposed in which the pulse width of the pulse output from the converter is made to vary inversely with the frequency of the oscillator. In this manner it is possible to compensate the ultrasonic Doppler flowmeter for changes in oscillator frequency and for changes created by drift of the multivibrator that is normally used in the frequency-to-voltage converter.

An object of this invention is to remove errors in ultrasonic Doppler flowmeters due to variations in the pulse width and the oscillator frequency by making the pulse width inversely proportional to the oscillator frequency.

Figure 2:
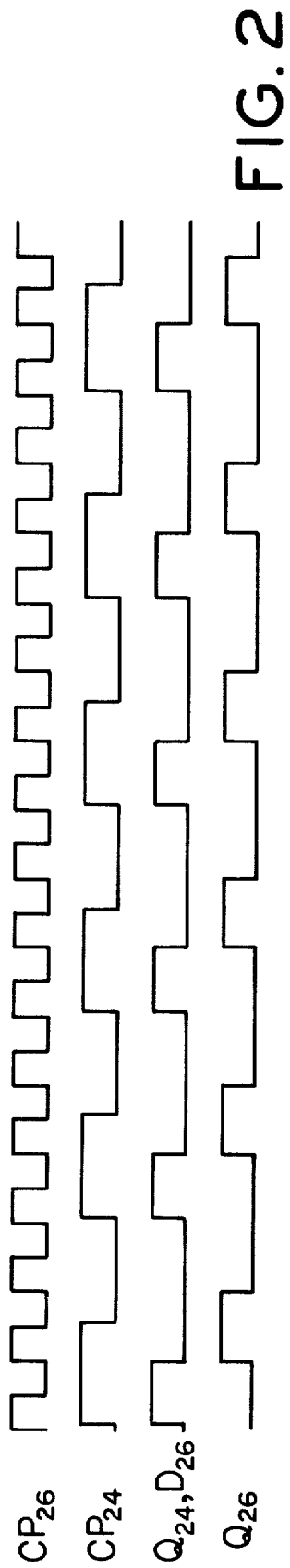

Other objects and advantages and features of this invention will become apparent to those skilled in the art without departing from the scope and spirit of this invention and it should be understood that the latter is not necessarily limited to the above mentioned discussion and drawings in which FIG. 1 is a block diagram of an ultrasonic flowmeter and FIG. 2 is a timing diagram of the ultrasonic Doppler flowmeter of FIG. 1.

Referring to FIG. 1, there is shown a block diagram of an ultrasonic Doppler flowmeter including an oscillator 10, having an output frequency $f_o$. The output frequency $f_o$ from the oscillator is applied to an ultrasonic transducer 12 for producing a beam of ultrasonic energy 12a. The ultrasonic transducer 12 may be of any well known type such, for example, as those manufactured from lead zirconate titanate. The ultrasonic transducer 12 is positioned with respect to a pipe or conduit such that the ultrasonic beam 12a is directed at an angle $\theta$ to the direction of flow in the pipe or conduit. Any particles or bubbles in the flowing liquid will reflect a portion of the energy back toward the vicinity of the transmitting transducer 12 as shown as a beam of ultrasonic energy 14a to impinge upon an ultrasonic transducer 14. The ultrasonic energy impinging on the ultrasonic transducer 14 will generate an output signal from the ultrasonic transducer 14 that has a frequency that is displaced from the transmitted frequency $f_o$ by an amount dependent upon the rate at which the fluid and its particles and air bubbles is flowing in the conduit or pipe. The electrical signal from the transducer 14 is applied to the input of a tuned RF amplifier 16 that is tuned to have optimum amplification in the range of frequency which will include $f_o$, the transmitted frequency, and include a band of frequencies at least as wide as the frequencies anticipated from the velocity of the fluid that is to be measured. Not only does the ultrasonic transducer 14 apply to the input of the RF amplifier 16, a frequency corresponding to the ultrasonic frequency included in the reflected light beam 14a, but it also includes the frequency $f_o$. The signal having the frequency $f_o$ is generally obtained from direct coupling of the ultrasonic energy from the ultrasonic transducer 12 to the ultrasonic transducer 14. Thus, the output from the RF amplifier 16 includes not only the frequency of the reflected signal, but also includes a signal having the frequency $f_o$ of the transmitted signal.

The output signal from the RF amplifier 16 is applied to the input of an envelope detector 18. The envelope detector 18 produces at its output a signal having a frequency corresponding to the difference between the transmitted frequency $f_o$ and the received reflected frequency. The difference between these two frequencies is the Doppler frequency $F_d$. The output from the envelope detector 18 is applied to the input of an audio amplifier 20 and is, in turn, applied as an input to a limiter 22 to produce at the output of the limiter 22 a substantially square wave at the Doppler frequency $F_d$.

The square wave output signal from the limiter 22 having a frequency equal to the Doppler frequency, is applied to a frequency-to-voltage converter including a pair of D-type flip-flops 24 and 26 and a low-pass filter 28. The D-type flip-flops 24 and 26 may preferably be of the type identified as 4013. Each of these flip-flops has independent data, set, reset, and clock inputs and an output. The logic level present at the data input D is transferred to the output Q during the positive-going transition of a pulse on the clock input CP. Setting or resetting is independent of the clock and is accomplished by a HIGH level on the set or reset line respectively. As shown, the output from the limiter 22 is applied to the clock input, CP of flip-flop 24.

Referring to D-type flip-flop 24, the data input D is connected to a positive voltage source +V, the set terminal SD is connected to ground and the reset terminal MR is connected to the output Q of the flip-flop 26. The output Q from flip-flop 24 is connected to the data input terminal D of flip-flop 26.

The clock input terminal CP of the flip-flop 26 is connected to the output of a frequency divider 30 having its input connected to receive the output signal $f_o$ from the oscillator 10. The frequency divider divides the frequency oscillator $f_o$ by any convenient integer. In one application it has been found that the division by 128 provided satisfactory operating result. The output from the frequency divider 30 is thus a square wave having a frequency $f_o/128$.

The operation of the frequency-to-voltage converter comprising the flip-flops 24 and 26 can best be understood by reference to FIG. 2 showing the important changes in signal level at various terminals of the flip-flops 24 and 26. The first signal shown in FIG. 2 is the clock pulse obtained from frequency divider 30 and applied to the clock terminal CP of flip-flop 26, identified in FIG. 2 as $CP_{26}$. The input to the clock input terminal CP of flip-flop 24 is a square wave at the Doppler frequency received from the limiter 22, and identified in FIG. 2 as $CP_{24}$. The application of the square wave at frequency $f_o/128$ to the clock input of flip-flop 26 will produce a change in the flip-flop at every positive going transition if the data input terminal is HIGH. The data input terminal of the flip-flop 26 is connected to the Q output terminal of the flip-flop 24 and will be LOW unless the flip-flop 24 has been triggered by a positive going transition applied to its clock input terminal CP. Thus, as shown in FIG. 2, the first positive going transition of $CP_{26}$ produces no changes in the flip-flop 26. A positive going transition is indicated in FIG. 2 for $CP_{24}$ at a time interval shortly after the positive going transition of the signal $CP_{26}$. As the data terminal D of the flip-flop 24 is always HIGH by virtue of its connection to $+V$, the positive going transition in $CP_{24}$ will trigger the flip-flop 24 to its opposite state and produce a HIGH level at the output terminal Q of the flip-flop 24 which in turn produces a HIGH level at the data terminal D of the flip-flop 26.

At the next positive going signal from frequency divider 30 applied to the clock pulse input CP of the flip-flop 26, the flip-flop 26 will change state and the output appearing at its output terminal Q identified in FIG. 2 at $Q_{26}$ changes from a LOW level to a HIGH level. At the time that the HIGH level appears at the output of the flip-flop 26, the connection from the output terminal Q of the flip-flop 26 to the reset input MR of the flip-flop 24, the flip-flop 24 will be reset to its original state, returning its output Q to a LOW level. As a positive going signal is required at the input CP of the flip-flop 26 to trigger the flip-flop 26 from one state to the other, the output Q from the flip-flop 26 will remain at a HIGH level until the next positive going signal from frequency divider 30 is applied to the clock pulse input CP of the flip-flop 26. This positive going signal returns the flip-flop 26 to its original state with the output terminal Q at a LOW level. There has thus been generated at the output terminal Q of the flip-flop 26, a HIGH level pulse having a pulse width of time duration equal to the period of the square wave signal $f_o/128$ produced at the output of the frequency divider 30. The pulse width output from the flip-flop 26 is thus inversely proportional to the frequency $f_o$ produced by the oscillator 10 and applied to the transducer 12. From $Q_{26}$ shown in FIG. 2 it is apparent that with the Doppler frequency $F_d$ shown as $CP_{24}$ there is produced a series of HIGH level pulses of width determined by the oscillator frequency $f_o$ and occurring at a rate determined by the Doppler frequency square wave applied to the clock pulse terminal CP of the flip-flop 24. By producing in the frequency-to-voltage converter a pulse width varying inversely with changes in the transmitted frequency, the changes in the Doppler frequency due to changes in the transmitted frequency are compensated to produce an output voltage having an average value that is solely related to the fluid velocity and independent of the frequency of the transmitted signal.

The HIGH level pulses from the output terminal Q of the flip-flop 26 are applied to the input of the low pass filter 28 which, varying proportionately to the pulse repetition rate and the pulse width, produces an output signal that is proportional to the Doppler frequency $F_d$ and inversely proportional to the transmitted frequency $f_o$. The output from the low pass filter 28 is shown applied to an indicator 30 for indication of the flow of fluid producing the reflected ultrasonic energy 14a. Indicator 30 is representative of any conventional output device that may indicate, record or control the flow of the fluid.

While the invention has been described with respect to its application to an ultrasonic Doppler flowmeter, it is to be understood that the invention is not limited to such application but may be used in any system where measurement of rate of motion and/or its control is made based upon a Doppler signal produced by reflections from a moving body or particle of a signal having an alternating component.

What is claimed is:

1. In a Doppler meter in which the Doppler frequency is converted to a d.c. output signal representative of the rate of motion of a reflector the improvement for compensating said d.c. output signal for changes due to changes in the transmitted signal comprising
    pulse generating means responsive to said Doppler frequency and to said transmitted frequency to generate a series of constant amplitude pulses having a frequency varying as said Doppler frequency and a pulse length duration varying inversely with said transmitted frequency.

2. Apparatus as claimed in claim 1 in which said Doppler meter is a flowmeter and in which said pulse generating means includes a pair of flip-flops.

3. Apparatus as claimed in claim 2 in which the input of one said flip-flop is connected to a frequency source having said Doppler frequency and the input of said other flip-flop is connected through a divider to the source of said transmitted frequency.

4. A Doppler flowmeter for measuring the flow of a fluid comprising:
    oscillator means for producing an a.c. signal having a first frequency,
    first transducer means connected to said oscillator means for producing an alternating signal of said first frequency to be transmitted through said fluid with a component parallel to the direction of said flow,
    second transducer means responsive to alternating signals reflected from said flowing fluid and to signals received from said first transducer means to produce an output signal having in combination said first frequency and a second frequency shifted from said first frequency by an amount determined by said flow of said fluid,
    envelope detector means connected to the output of said second transducer means to produce an output signal having a frequency component varying as the Doppler frequency difference between said first and said second frequencies, and pulse generator means having first and second input terminals connected respectively to said oscillator means and to said envelope detector to produce a train of output pulses having an average value directly related solely to said flow of said fluid.

5. In an ultrasonic Doppler flowmeter in which the Doppler frequency is converted to a d.c. output signal representative of flow the method of compensating the output signal for changes in the transmitted frequency comprising the steps of:

converting the Doppler frequency to a series of pulses of constant amplitude and of frequency corresponding to said Doppler frequency, and varying the duration of said pulses inversely in accordance with said transmitted frequency.

* * * * *